United States Patent [19]

Smirnov et al.

[11] Patent Number: 5,256,017

[45] Date of Patent: Oct. 26, 1993

[54] COMPOSITE BLIND RIVET ASSEMBLY

[75] Inventors: B. E. Smirnov; S. G. Golinskikh, both of Nijney Novgorod, U.S.S.R.

[73] Assignees: P/O Normal, U.S.S.R.; VSI Corporation, Chantilly, Va.; a part interest

[21] Appl. No.: 622,435

[22] Filed: Dec. 6, 1990

[51] Int. Cl.$^5$ .............................................. F16B 13/04
[52] U.S. Cl. .......................................... 411/43; 411/54; 411/55
[58] Field of Search ...................... 411/34, 38, 55, 70, 411/43, 44, 54

[56] References Cited

U.S. PATENT DOCUMENTS

| | | |
|---|---|---|
| 2,324,142 | 7/1943 | Eklund . |
| 3,129,630 | 4/1964 | Wing et al. ........................ 411/43 |
| 3,643,544 | 2/1972 | Massa ............................... 411/43 |
| 4,168,650 | 9/1979 | Dahl et al. ........................ 411/43 |
| 4,203,346 | 5/1980 | Hall et al. . |
| 4,312,613 | 1/1982 | Binns ............................. 411/43 X |
| 4,364,697 | 12/1982 | Binns ............................. 411/38 |
| 4,457,652 | 7/1984 | Pratt .............................. 411/38 |
| 4,595,324 | 6/1986 | Sadri ............................. 411/38 |
| 4,950,115 | 8/1990 | Sadri ........................... 411/55 X |

FOREIGN PATENT DOCUMENTS

| | | | |
|---|---|---|---|
| 170769 | 2/1986 | European Pat. Off. .......... 411/43 |
| 2168122 | 6/1986 | United Kingdom .............. 411/43 |

Primary Examiner—Rodney M. Lindsey
Attorney, Agent, or Firm—Irving Keschner

[57] ABSTRACT

A blind rivet assembly comprising a body made with an insertion head at one end and having a setting concave face at the other end, and an axial thread hole in which a screw is located, the screw having a head at one end and a break-away stem at the other end. A deformable, cylindrical socket, or sleeve, with a two-step axial hole is installed on the screw between its head and the setting concave face of the body, the step with the larger inside diameter being located at the side of the body. In order to prevent damage to the composite materials which are being joined and the tearing-off of the screw by limiting assembly loads, the axial hole of the cylindrical sleeve has an additional step with the smallest inside diameter located at the side of the screw head, a predetermined ratio of the thickness of the walls of the additional step and the second step adjacent being provided, the thickness of the wall and the length of the second step also having a predetermined range.

1 Claim, 2 Drawing Sheets

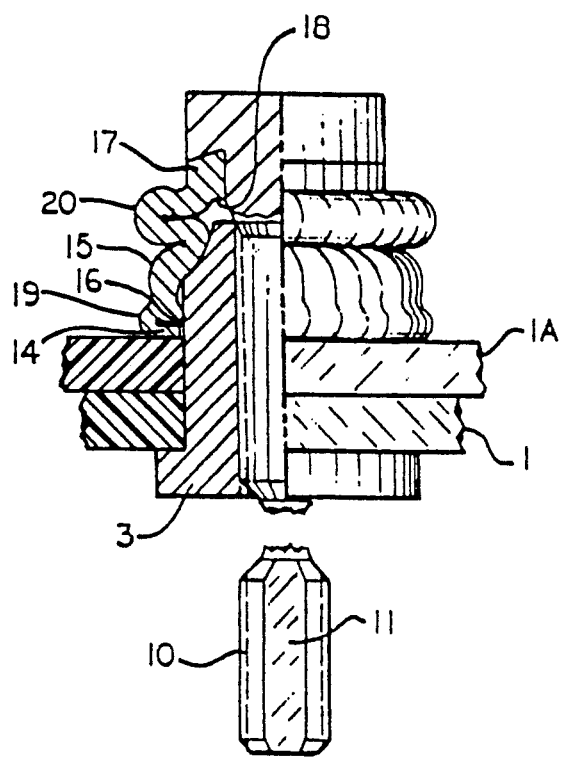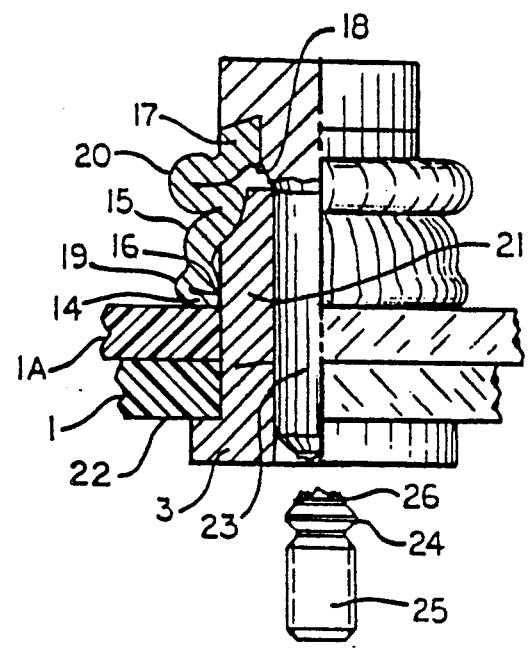

COMPOSITE BLIND RIVET ASSEMBLY

BACKGROUND OF THE INVENTION

1. Field of the Invention

The present invention relates to blind rivet fasteners and, in particular, to a blind rivet fastener in which the primary load is transferred through the insertion head thus limiting damage to the composite materials being joined and enabling the fastener to be utilized with panels of various thicknesses.

2. Description of the Prior Art

Three piece blind fasteners have been known and used for many years, the three pieces consisting of a nut threaded onto a bolt and an expandable sleeve located therebetween. Prior three piece blind fasteners were found to encounter significant problems when utilized with sheets of material which are relatively soft or material such as a graphite composite or when utilized in structures in which very thin sheets of material are utilized on the blind side. In particular, the force applied by the sleeve on the blind side surface would be sufficiently high to deform the blind side surface and weaken the sheet at that point. Blind rivet fastener assemblies have been developed to achieve a large bearing surface on the blind side so that such materials could be properly fastened with minimal damage to the blind side. However, disadvantages still are associated with their use. For example, U.S. Pat. No. 4,203,346 to Hall et al. discloses a fastener which produces a relatively small bearing surface on the blind side particularly when compared to the length of sleeve employed. In addition, the fastener has a tendency to delaminate a portion of the back surface. Moreover, the internal taper of the sleeve bore increases its cost to manufacture.

U.S. Pat. No. 4,457,652 to Pratt provides a blind fastener which seeks to overcome the disadvantages of the prior art as exemplified by the Hall et al. patent by providing a blind fastener which comprises a nut with an axial bore therethrough and with a conically shaped nose at one end and an enlarged head at the other end. Extending through the nut is a bolt having a stem and having an enlarged head adjacent to the nut nose. Between the nut nose and the bolt head is a sleeve on the bolt stem. The sleeve has a thick wall section adjacent to bolt head and a thin wall section adjacent to the nut nose formed by a recess in the section. A collar is provided on the bolt stem between the nut nose and the sleeve, the collar having a tensile strength less than the tensile strength of the sleeve. The sleeve is adapted upon the setting of the fastener to initially expand its thin wall section over the nut with the collar therebetween, then to have the free end of the thin wall section taper inwardly toward the nut. Thereafter the thin wall section buckles outwardly upon contact with the blind surface of the parts being fastened to form a large bearing surface.

Although the Pratt patent purports to provide an improved blind fastener assembly particularly adapted for use with composite materials, a significant amount of load is transferred to the composite bearing surface during the installation process, thus increasing the probability that damage will occur to the blind side surface.

U.S. Pat. Nos. 4,312,613 and 4,364,697 to Binns disclose blind fastener assemblies which have specific configurations such that controlled buckling is provided to increase the bearing area, thus reducing the possibility of failure of the composite material which forms the workpieces to be joined. However, as with the Pratt patent, a significant amount of load is still transferred to the composite bearing, or blind, surface.

U.S. Pat. No. 2,324,142 to Eklund discloses an early blind fastener assembly design which, although disclosing bulbing (buckling) to hold the parts riveted in place, is not concerned with parts fabricated from composite materials.

What is thus desired is to provide an improved blind fastener assembly for joining parts made of composite materials and which significantly reduces and controls the load transferred to the composite bearing (blind) surface during the installation process enabling the fastener to be utilized to secure together composite sheets, or panels, of various thicknesses.

SUMMARY OF THE PRESENT INVENTION

The present invention provides a blind rivet assembly comprising a rivet made with an enlarged head at one end and having a setting concave face at the other end, and an axial thread hole in which a screw is located, the screw having a head at one end and a break-away stem at the other end. A deformable, cylindrical sleeve, or socket, with a two-step axial hole is installed on the screw between its head and the setting concave face of the rivet, the step with the larger inside diameter being located at the side of the rivet. In order to prevent damage to the composite materials which are being joined and premature tearing-off of the screw by limiting assembly loads, the axial hole of the cylindrical sleeve has an additional step with the smallest inside diameter located at the side of the screw head, a predetermined ratio of the thickness of the walls of the additional step and the second step adjacent being provided, the thickness of the wall and the length of the second step also being within a predetermined range.

The present invention thus provides an improved blind rivet fastener assembly for joining parts made of composite material, the design of which prevents damage to the connected parts and the tearing-off of the screw by controlling the loads applied to the bearing surface of the composite material. The assembly is simple in design, relatively inexpensive to fabricate and easy to install using conventional tooling.

DESCRIPTION OF THE DRAWINGS

For a better understanding of the invention as well as other objects and further features thereof, reference is made to the following description which is to be read in conjunction with the accompanying drawing wherein:

FIG. 5 illustrates the fastener of FIG. 1 after the installation process has been completed; and FIG. 6 is similar to FIG. 5 but illustrates another embodiment utilizing a threadless bolt.

DESCRIPTION OF THE PREFERRED EMBODIMENT

Figure 1:
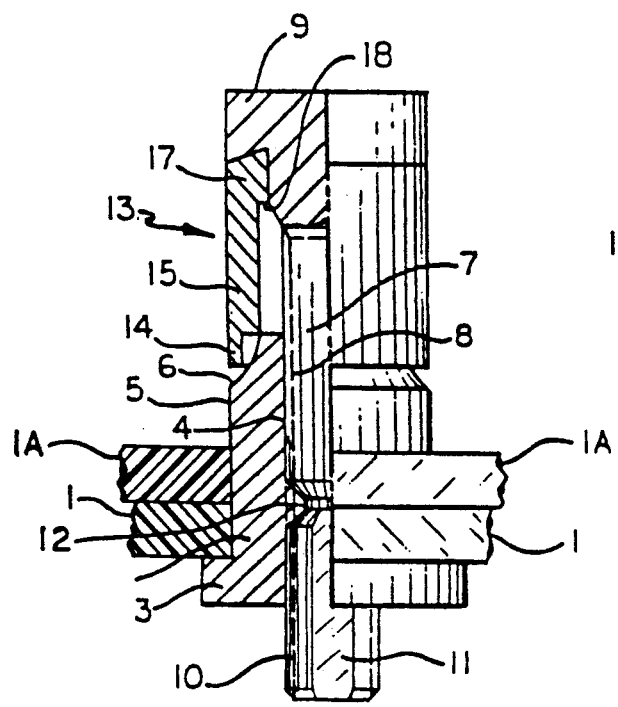
FIG. 1 is a partial axial cross-section of an assembled fastener prior to installation.
Figure 2:
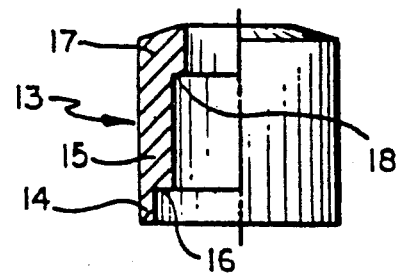
FIG. 2 illustrates in more detail the assembly deforming element.

The fastener, or blind rivet assembly, of the present invention used for connecting the sheets 1 and 1A comprises a rivet body 2 of a predetermined diameter and having an enlarged head 3, threaded hole 4, cylindrical portion 5, and concave setting face 6, screw 7 with threads 8, head 9, stem 10 having flats 11, breakneck collar 12, and deformable element 13. Element 13 is in the form of a hollow cylindrical three-step socket with a constant outside diameter, the thickness of the first step 14, located at the side of the setting face 6 of rivet 2, being smaller than that of the intermediate second step 15, having the shoulder 16. The thickness of the wall of the third step 17, having the shoulder 18, is preferably in the range from 1.25 to about 1.4 times greater than the thickness of the wall of the second step 15.

The rivet installation process is as follows: The rivet 2 is inserted into the hole of connected panels, or sheets, 1 and 1A, until one of them pushes against the surface of the enlarged head 3 of rivet 2 (FIG. 1).

Figure 3:
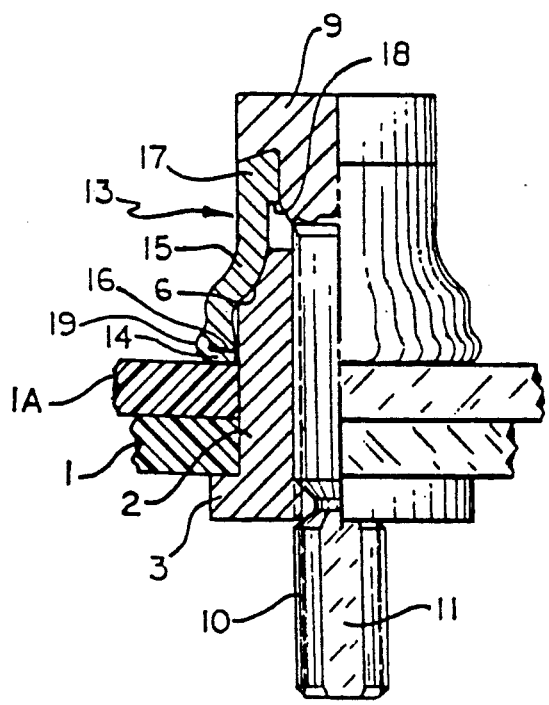
FIG. 3 illustrates the preliminary deformation of the assembly deforming element of FIG. 2.
Figure 4:
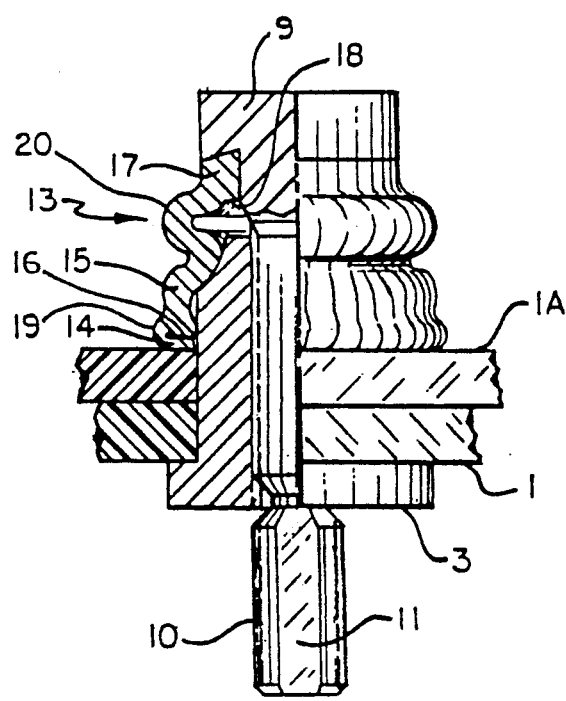
FIG. 4 illustrates the secondary buckling of the assembly deforming element as the pull up load increases.

As screw 7 is rotated by an installation tool (not shown) engaging flats 11, element 13 begins deforming along the concave setting face 6 of rivet 2. When approaching the crossing line of the cylindrical portion 5 and the setting face 6 of rivet 2, the first step 14 of the element 13 bends off parallel to the rivet axis. Under the effect of the rotating screw 7, the deformed element 13 continues to move and the second step 15 bends, or buckles, over relative to the crossing line of the setting face 6 and the cylindrical member 5 of the body 2, and the first step 14 of the deformed element 13 takes a position parallel to the surface of the sheet 1A. The second step 15 continues to move downward along the cylindrical portion 5 of the body 2 until the first step 14 pushes against the surface of the sheet 1A as shown in FIG. 3. As the pull-up load continues to increase, a bulge, or locking head, 19 is formed (FIG. 3). As screw 7 is further rotated, the shoulder 16 of the second step 15 pushes against the first step 14 gradually creating an increasing load on sheets 1 and 1A. When the maximum permissible load is achieved, deformation of the section of the second step 15 begins, the latter being located between the setting face 6 of the rivet 2 and the third step 17, with the formation of the second bulge 20 (FIG. 4). FIG. 4 illustrates the secondary buckling of the assembly deforming member 15 as the pull-up load increases. At this moment, a further increase in the compressive load ceases, which prevents damage to this surface of sheet 1A in the area of the bulge 19. When the degree of the deformation of the second step 15 increases, the third step 17 which, due to the continuity of the material of the deformed element 13, bends off to the side of the bulge 20, pushes with its shoulder 18 against the inside surface of the bulge 20, thereby further restricting the deformation of the second step 15, until it stops completely. As a result, the rotation of the screw 7 becomes slower and its axial movement stops. The installation tool continues to rotate screw 7 by means of the flats 11 of the stem 10, until it tears off along the collar 12, after which the assembly of the riveting connection is completed (FIG. 5). The load transfer effect as the installation is being completed is such that most of the load is transferred through the portion of the assembly deforming member 13 contacting concave setting face 6 and through enlarged head 3 in the direction of arrow A, the balance of the load being applied to the area of contact between bulge 19 of assembly deforming member 13 and the surface of sheet 1A. The hold down load, or force, applied to sheets 1 and 1A is substantially constant and independent of the thickness of sheets 1 and 1A, thus preventing damage to the surface of sheet 1A in the zone of bulge 19.

The rivet can be made as a threadless structural embodiment as shown in FIG. 6. In this version, instead of the body with the threaded hole 4 and the screw 7, the body 21 is used with the inside cylindrical surface 22 and the core 23 with the ring knurling 24 on stem 25. During assembly of the riveting connection, the core 23 is pulled beyond the stem 25 into the body 21 with deformation of element 13 occurring in the manner illustrated in FIG. 5 before the tearing-off of the stem 25 along the breakneck 26.

The preferred thickness of the wall and the length of the second step 15 is, respectively, in the range from about $0.1$ d to about $0.15$ d and from about $0.8$ d to about $1.2$ d, where d is the diameter of the rivet body 2.

When the thickness of the wall of the second step 15 is smaller than $0.1$ d, cracking of this wall can occur due to its small thickness, and when the thickness of the wall is greater than $0.15$ d, a load is required for the deformation of the second step, which is higher than the load at which damage to the connected sheets occurs. When the length of the second step is smaller than $0.8$ d, the load for its deformation is greater than the load for the damage to the connected sheets 1 and 1A, and when the length exceeds $1.2$ d, the deformation of the second step can begin too early, long before the completion of the formation of bulge 19. In this case, bulge 20 will not allow itself to reach the proper diameter so that it can function properly, the tearing-off of the screw 7 along the collar occuring before bulge 20 begins to fold on itself.

When the ratio of the thickness of the walls of the third step and the second step is lower than 1.25, the third step may not support formation of bulge 20 because the shoulder of the third step is too small, or, in other words, the difference between the thickness of the walls of the third and second steps of the deformed elements is small. When this ratio exceeds 1.4, the deformation of the third step as compared with the second one, would be hampered due to a great difference in the value of the loads necessary for the formation of bulge 20 and the deformation of the third step. As a result, the shoulder of the third step would either fail to catch bulge 20 or to come into contact after the cracking of bulge 20 or the tearing-off of the screw along the thread would have occurred.

By providing a three-step deformable element 13 with the optimal ratio of the dimensions of the steps as set forth hereinabove, possible damage to fragile composite materials during the fastening of the composite materials is prevented by limiting the load.

The load necessary to form bulges 19 and 20 is mainly dependent on the load of the tearing-off of the screw along the collar, which, in turn, is dependent on the diameter of the tearing-off collar and the durability of the screw material. With due consideration of the permissible deviations of the collar diameter and variation of the yield strength value of the screw material after thermal treatment (for example, in the case of screws that are made of steel that have a tensile strength of 120–140 Kgf/mm$^2$), the variation of the loads of the tearing-off along the collar can reach 30%, and the minimal required diameter of the collar is assigned in such a way that at the minimal strength of the screw the minimal permissible collapse of element 13 would be ensured or, in other words, the possible premature tearing-off of the stem along the collar would be prevented. Based on the above, the maximum load of the tearing-off along the collar can be 30% higher, and this increase of the load is of an objective nature and it is impossible to limit it. Due to the high loads of the tearing-off of the screw along the collar, the load of the collapsing of element 13 reaches such a high value that the crumpling and then the destruction of the composite material begins under the locking head of the rivet 2, because its supporting surface is smaller than that of the enlarged head. During the assembly, the high quality of the riveting connection is insured, and the formation of the proper bulging on the second step of the deformed element 13 and the stopping of the rivet by pushing the shoulder of the third step against bulge 20 makes it possible to considerably expand the range of the loads of the tearing-off of the screws along the collar.

The present invention thus provides an improved blind rivet fastener assembly for clamping sheets of composite material having a range of thicknesses in a manner such that damage to the composite material is minimized during the installation process. The assembly is simple in design and relatively inexpensive to fabricate.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

We claim:

1. A blind fastener rivet assembly for fastening a composite structure from one side thereof comprising:
   a cylindrical body element of a diameter d and having an axial bore therethrough, said body element having an enlarged head at one end and a concave shaped face at the other end;
   a bolt having a stem extending through said bore and having an enlarged head adjacent the concave shaped face on said body element;
   a cylindrically shaped deformable element positioned on said bolt stem between said concave shaped face and said bolt head, said deformable element having first, second and third wall sections of differing thicknesses along the length thereof whereby the collapse of said deformable element during installation forms a buckle which contacts a surface of said structure, any damaging installation load being directed away from the composite structure to said deformable element and then to said cylindrical body element thus providing protection for the composite structure; and
   wherein said first wall section is adjacent to the concave shaped face of said body element; and
   wherein said second wall section is adjacent said first wall section and said third wall section is adjacent said second wall section; and
   wherein the thickness of said third wall section is in the range from about 1.25 to about 1.4 times greater than the thickness of said second wall section; and
   wherein the thickness of said second wall section is in the range from about 0.1 d to about 0.15 d; and
   wherein the length of said second wall section is in the range from about 0.8 d to about 1.2 d.

* * * * *